United States Patent [19]

Dent, III et al.

[11] 3,952,329

[45] Apr. 20, 1976

[54] PULSE COMPRESSION RECORDING

[75] Inventors: Roy F. Dent, III; Richard C. Schneider, both of Boulder County, Colo.

[73] Assignee: International Business Machines Corporation, Armonk, N.Y.

[22] Filed: Feb. 6, 1975

[21] Appl. No.: 547,909

[52] U.S. Cl................................. 360/40; 325/38 A
[51] Int. Cl.²....................... G11B 5/09; H04L 3/00
[58] Field of Search............. 360/39, 40; 325/38 A, 325/38 R; 178/69.5 R

[56] References Cited
UNITED STATES PATENTS

| | | | |
|---|---|---|---|
| 3,781,873 | 12/1973 | Nussbaumer | 325/38 A |
| 3,882,485 | 5/1975 | Bluestein et al. | 325/38 A |

*Primary Examiner*—Vincent P. Canney
*Attorney, Agent, or Firm*—Herbert F. Somermeyer

[57] ABSTRACT

Data signals are linearly recorded on a record medium as a sequence of discrete amplitude levels, each level occurring in a bit period. For each received data bit signal, a separate sequence of such levels is generated in accordance with a predetermined rule such that each separate sequence of levels extends over a predetermined number of data bit periods. All of the amplitude levels from a plurality of data bit signals occurring in each data bit period are summed together to provide a resultant amplitude to be recorded. Such resultant amplitude in each data bit period is linearly recorded on the record medium. Readback and detection of such recorded signals is accomplished by first recovering data bit signals by supplying the readback signals through a filter matched to the sequence (preferably a tapped delay line) for reconstituting the data bit signals. The reconstituted data bit signals are then detected using known data bit detection techniques. The techniques are also applicable to other types of digital channels.

11 Claims, 4 Drawing Figures

PULSE COMPRESSION RECORDING

DOCUMENTS INCORPORATED BY REFERENCE

*Radar Signals (Electrical Science Series)*, Charles E. Cook and Marvin Bernfeld, Academic Press, 1967, particularly see Pages 9–15, 254–255, and 264–269.

Fiorino U.S. Pat. No. 3,818,501 shows a detector usable as detector 50.

Cannon U.S. Pat. No. 3,789,380 shows a recording system employing synchronous bias.

BACKGROUND OF THE INVENTION

The present invention relates to recording and readback systems, and particularly those recorders which employ a specific code for recording data signals.

Digital signal recorders have been used in connection with data processing systems ever since the conception of data processing. Over the years, the recording density, i.e., the number of data bits recordable per unit of length, such as per centimeter, has been continually increasing. An advantage of increased data recording density is not only reduced access time to the data, but also the volumetric efficiency for storing data is enhanced. When data bit densities have passed 20,000 bits per centimeter, error rates increase to unacceptably high levels. At lower densities, exotic error correction codes are suitable for accommodating errors resulting from recording and readback of digital signals. Additionally, formatting of digital signals on a record medium includes interleaving, such that signals relatable to a given code word or set of code words are spaced along a record track. The effect of such spacing is to reduce the impact of signal dropouts, such as caused by debris on the medium; scratches, etc., on the medium; and momentary medium-to-transducer separation. While such interleaving is suitable for certain densities, at extremely high densities, i.e., at or above 20,000 bits per centimeter, interleaving to be effective for a suitable medium length becomes complicated and expensive to implement. Hence, other means must be provided to reduce the adverse effect of signal dropout while keeping the cost of such digital signal recorders to an acceptable level.

Another technique of increasing recording density is to increase the number of tracks per centimeter. As such tracks are placed closer and closer, unwanted signals from adjacent tracks can become a problem. Accordingly, it is desired that recording techniques be employed which reduce the effect of track-to-track signal transfer. Hence, noise immunity of the recording system should be inherent by the recording scheme and format of the signals on the record medium.

SUMMARY OF THE INVENTION

According to the present invention, digital data signals are dispersed within a data channel using pulse compression recording. Such dispersed signals have a strong autocorrelation approximating a delta function such that each bit cell contains but a small percentage of information relatable to a given data bit signal. A preferred mode of generating such signals is to convert each data bit signal into a sequence of discrete amplitude levels and then overlay the signal levels of each bit period to generate a signal to be recorded having a given discrete amplitude. This given amplitude of each bit period is linearly transmitted or recorded such that, on recovery the various amplitudes can be decoded to reconstruct the original data bit signals using autocorrelation techniques.

By selecting substantially orthogonal signal sequences in adjacent tracks or channels, interference between tracks or channels can be substantially reduced.

In another aspect of the present invention, the recording waveform is a series of step functions as opposed to a saturation-to-saturation state transition.

In another aspect, synchronous AC bias is combined with the multilevel linear recording for improving recording fidelity.

In a specific aspect of the invention, a tapped delay line is used in both the recording and readback portions of the recording channel for realizing the autocorrelative delta functions. In another specific aspect of the invention, charge transfer devices synchronized by a clock are used to generate the autocorrelation function.

In an economical embodiment of the present invention, the tapped delay lines separated by an analog current summer are in cascode connection for generating an extremely long autocorrelative signal function with a minimum of electrical circuits.

The foregoing and other objects, features, and advantages of the invention will become apparent from the following more particular description of a preferred embodiment of the invention, as illustrated in the accompanying drawing.

THE DRAWING

DETAILED DESCRIPTION

Figure 1:
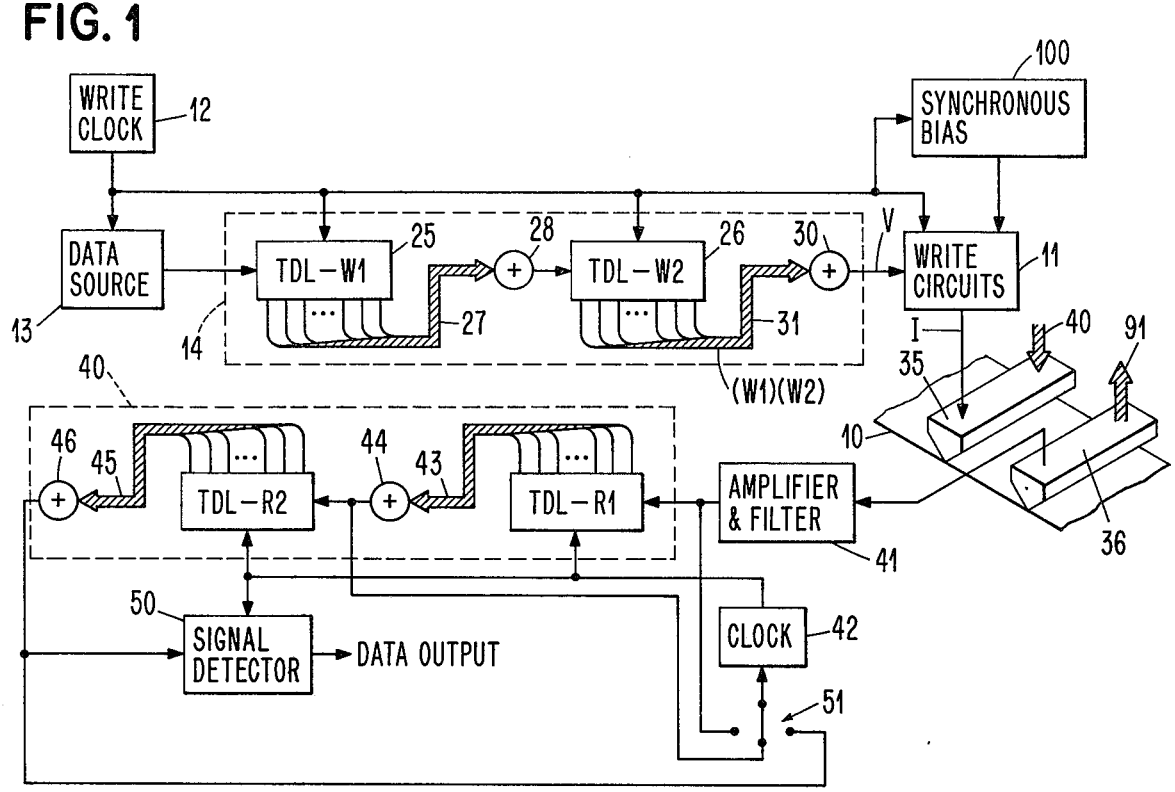
FIG. 1 is a diagrammatic showing of a recorder using the present invention.

Referring now more particularly to the appended drawing, like numerals indicate like parts and structural features in the various diagrams. The preferred recording medium to be used with the present invention is either a single or multiple track magnetic tape 10, although magnetic disks, other linear record media, and other types of data or digital channels may be used with equal facility. Signals are recorded on medium 10 in a linear manner by a set of write circuits 11 timed by write clock or oscillator 12. Data from source 13, timed by write clock 12, supplies data signals to sequence generating filter 14. Filter 14, in turn, supplies a step-type discrete level to write circuits 11 for linear recording. For example, write clock 12 may supply the write clock signal 15 (FIG. 2) to time a NRZ signal 16 from source 13. Alternatively, an NRZI signal 16A may be supplied. For purposes of discussion, NRZ signal 16 is used. Sequence generating filter 14 receives NRZ signal 16 and generates digital recording signal 17. The discrete amplitudes of signal 17 are in accordance with a sequence, as will be more fully later described, as opposed to being a two-state or three-state recording signal. Accordingly, the recording on medium 10 is preferred to be linear—not saturate.

Sequence generating filter 14 can be constructed with various implementations. Sequences to be generated based upon the data signals include those signal sequences described in *Radar Signals, An Introduction to Theory and Application*, by C. E. Cook and M. Bernfeld, Academic Press, 1967, supra. Signal sequences described in this book include linear FM, discrete coded waveforms, and pseudo random sequences. Well-known signal sequences are the Barker sequences, Frank codes, and Huffman sequences. Based upon experimentation with the present invention, the inventors prefer the real Huffman sequences because of measured superior peak-to-sidelobe ratios. In accordance with the present invention, such sequences as may be generated by sequence generating filter 14 for each data bit are summed or overlayed with sequences of signals generated from other data bits such that recording signal 17 not only represents one bit, but is an analog summation of all sequences having signals in a given bit period. For example, the signal amplitude (either current or voltage) at 20 not only is a result of the data signal at 21, but is the analog summation of all signal amplitudes from all sequences up to a given number of bits which occur during that bit period. For example, if the selected Huffman sequence generates 400 signal levels for each data bit signal, then the signal amplitude at 20 is a result of the summation of all 399 bits preceding the data bit at 21. Similarly, if the sequence is 200 bits long, then the signal would be an analog summation of all amplitudes for the preceding 199 bits, etc.

Using a 20-bit Huffman sequence interleaved with itself (as later described), the response of sequence generating filter 14 to a single data bit from source 13 is the sequence of amplitude levels set forth in Table 1 below, such sequence of levels representing one selected Huffman sequence. Note that all the values are signed; the summation follows the signs. Such a sequence is generated, as later described, using interleaved delay line filter apparatus.

TABLE 1

| | | | | | | | |
|---|---|---|---|---|---|---|---|
| 1.00 | −1.28 | 2.77 | −1.78 | .58 | .16 | −2.49 | −1.69 |
| −.87 | −2.02 | −1.09 | 1.61 | 1.47 | −1.12 | −1.84 | −.18 |
| .86 | .30 | −.35 | −.27 | −1.28 | 1.65 | −3.55 | 2.29 |
| −.75 | −.20 | 3.20 | 2.17 | 1.12 | 2.59 | 1.40 | −2.07 |
| −1.89 | 1.44 | 2.37 | .23 | −1.11 | −.39 | .44 | .35 |
| 2.77 | −3.55 | 7.65 | −4.92 | 1.61 | .43 | −6.89 | −4.67 |
| −2.41 | −5.58 | −3.02 | 4.45 | 4.08 | −3.10 | −5.10 | −.50 |
| 2.39 | .83 | −.96 | −.74 | −1.78 | 2.29 | −4.92 | 3.17 |
| −1.03 | −.28 | 4.43 | 3.01 | 1.55 | 3.59 | 1.94 | −2.86 |
| −2.63 | 1.99 | 3.28 | .32 | −1.54 | −.54 | .62 | .48 |
| .58 | −.75 | 1.61 | −1.03 | .34 | .09 | −1.45 | −.98 |
| −.51 | −1.17 | −.63 | .94 | .86 | −.65 | −1.07 | −.11 |
| .50 | .17 | −.20 | −.16 | .16 | −.20 | .43 | −.28 |
| .09 | .02 | −.39 | −.26 | −.14 | −.31 | −.17 | .25 |
| .23 | −.17 | −.29 | −.03 | .13 | .05 | −.05 | −.04 |
| −2.49 | 3.20 | −6.89 | 4.43 | −1.45 | −.39 | 6.20 | 4.21 |
| 2.17 | 5.02 | 2.72 | −4.01 | −3.67 | 2.79 | 4.59 | .45 |
| −2.15 | −.75 | .86 | .67 | −1.69 | 2.17 | −4.67 | 3.01 |
| −.98 | −.26 | 4.21 | 2.85 | 1.47 | 3.41 | 1.84 | −2.72 |
| −2.49 | 1.89 | 3.12 | .31 | −1.46 | −.51 | .58 | .45 |
| −.87 | 1.12 | −2.41 | 1.55 | −.51 | −.14 | 2.17 | 1.47 |
| .76 | 1.76 | .95 | −1.40 | −1.28 | .98 | 1.61 | .16 |
| −.75 | −.26 | .30 | .23 | −2.02 | 2.59 | −5.58 | 3.59 |
| −1.17 | −.31 | 5.02 | 3.41 | 1.76 | 4.06 | 2.20 | −3.24 |
| −2.97 | 2.26 | 3.72 | .37 | −1.74 | −.61 | .70 | .54 |
| −1.09 | 1.40 | −3.02 | 1.94 | −.63 | −.17 | 2.72 | 1.84 |
| .95 | 2.20 | 1.19 | −1.76 | −1.61 | 1.22 | 2.01 | .20 |
| −.94 | −.33 | .38 | .29 | 1.61 | −2.07 | 4.45 | −2.86 |
| .94 | .25 | −4.01 | −2.72 | −1.40 | −3.24 | −1.76 | 2.59 |
| 2.37 | −1.80 | −2.97 | −.29 | 1.39 | .48 | −.56 | −.43 |
| 1.47 | −1.89 | 4.08 | −2.63 | .86 | .23 | −3.67 | −2.49 |
| −1.28 | −2.97 | −1.61 | 2.37 | 2.17 | −1.65 | −2.72 | −.27 |
| 1.27 | .44 | −.51 | −.40 | −1.12 | 1.44 | −3.10 | 1.99 |
| −.65 | −.17 | 2.79 | 1.89 | .98 | 2.26 | 1.22 | −1.80 |
| −1.65 | 1.25 | 2.06 | .20 | −.97 | −.34 | .39 | .30 |
| −1.84 | 2.37 | −5.10 | 3.28 | −1.07 | −.29 | 4.59 | 3.12 |
| 1.61 | 3.72 | 2.01 | −2.97 | −2.72 | 2.06 | 3.40 | .34 |
| −1.59 | −.55 | .64 | .50 | −.18 | .23 | −.50 | .32 |
| −.11 | −.03 | .45 | .31 | .16 | .37 | .20 | −.29 |
| −.27 | .20 | .34 | .03 | −.16 | −.05 | .06 | .05 |
| .86 | −1.11 | 2.39 | −1.54 | .50 | .13 | −2.15 | −1.46 |
| −.75 | −1.74 | −.94 | 1.39 | 1.27 | −.97 | −1.59 | −.16 |
| .75 | .26 | −.30 | −.23 | .30 | −.39 | .83 | −.54 |
| .17 | .05 | −.75 | −.51 | −.26 | −.61 | −.33 | .48 |
| .44 | −.34 | −.55 | −.05 | .26 | .09 | −.10 | −.08 |
| −.35 | .44 | −.96 | .62 | −.20 | −.05 | .86 | .58 |
| .30 | .70 | .38 | −.56 | −.51 | .39 | .64 | .06 |
| −.30 | −.10 | .12 | .09 | −.27 | .35 | −.74 | .48 |
| −.16 | −.04 | .67 | .45 | .23 | .54 | .29 | −.43 |
| −.40 | .30 | .50 | .05 | −.23 | −.08 | .09 | .07 |

Each identified level is a single bit period long, there being 400 (20 by 20) values; the sequence representing 400 bit cells. Hence, each data bit is represented in part in 400 bit cells. The actual recording signal is an analog summation of similar sequences for a succession of data bits. For example, 400 data bits are summed using the above-indicated sequence. When recording in accordance with Table 1 values, each individual bit cell contains but 0.25% of the information from 400 different bit cells. From this, it can be readily seen that the information is recorded over a relatively great expanse of track length creating an immunity to dropouts and noise up to given lengths. It has been shown, using autocorrelative analysis techniques, that such immunity extends for about 40 bit periods or about 10% of the 400 bit sequence. Such insensitivity to dropouts yields a good advantage in high-density recording, particularly if error correction codes are overlayed on the described sequence modulation scheme.

It will be appreciated by those skilled in the art that a tapped delay line having 400 taps can be difficult and costly to implement—it is very difficult to maintain constant amplitudes through such a long tapped delay line. In accordance with another aspect of the present invention, a long signal sequence is generated by interleaving two sequences each with a number of signals equal to a factor of the ultimate sequence. As shown in FIG. 1, a 400-bit sequence is generated by a cascade connection of two 20-bit interleaved sequences, respectively generated by tapped delay lines 25 and 26, respectively labeled TDL-W1 and TDL-W2. TDL-W1 is termed an inner sequence, while TDL-W2 is termed an outer sequence. The reduction in the number of delay line taps, and hence the total length of delay lines, is given by the equation:

$$MN/(M+N) \tag{1}$$

wherein M represents the number of taps in the inner sequence and N the number of taps in the outer sequence. It is to be understood that the number of cascade connected tapped delay lines can be greater than two and need not be equal in number.

The electrical arrangement of the cascade tapped delay lines is that TDL-W1 25 has 20 taps, each one bit period apart. The 20 taps are represented by a cable 27 consisting of 20 lines. All 20 lines are connected to summation circuit 28, which supplies an intermediate sequence signal, such are signal 29 of FIG. 2. Intermediate sequence signal 29 inputs to the second or outer sequence delay line TDL-W2 26 to generate the ultimate recording signal 17 through summing circuit 30. Cable 31, extending to circuit 30, likewise contains 20 tap output lines, as will become more apparent. The tap interval for TDL-W2 26 is 20 bit periods. In a constructed embodiment, the signal weight of the first, second, third, etc., tap outputs of TDL-W1 25 equalled the weighting of the corresponding taps of TDL-W2 26 yielding the described 400-bit signal sequence with minimal hardware. Different distribution of signal weighting at the taps yields different signal sequences.

A designer can match a coded sequence to a signal channel. Such matching includes selection of sequences of discrete levels in accordance with the present invention. For example, in magnetic recording type of signal channel, matching includes accenting given lower frequency signal components. Other channel characteristics may also be considered. For magnetic recording channels, Huffman-type sequences were found to have advantages. The Table 1 illustrated Huffman interleaved sequence was selected by the inventors as one suitable for a signal channel including a magnetic recording medium having a ferrous oxide coating.

Figure 2:
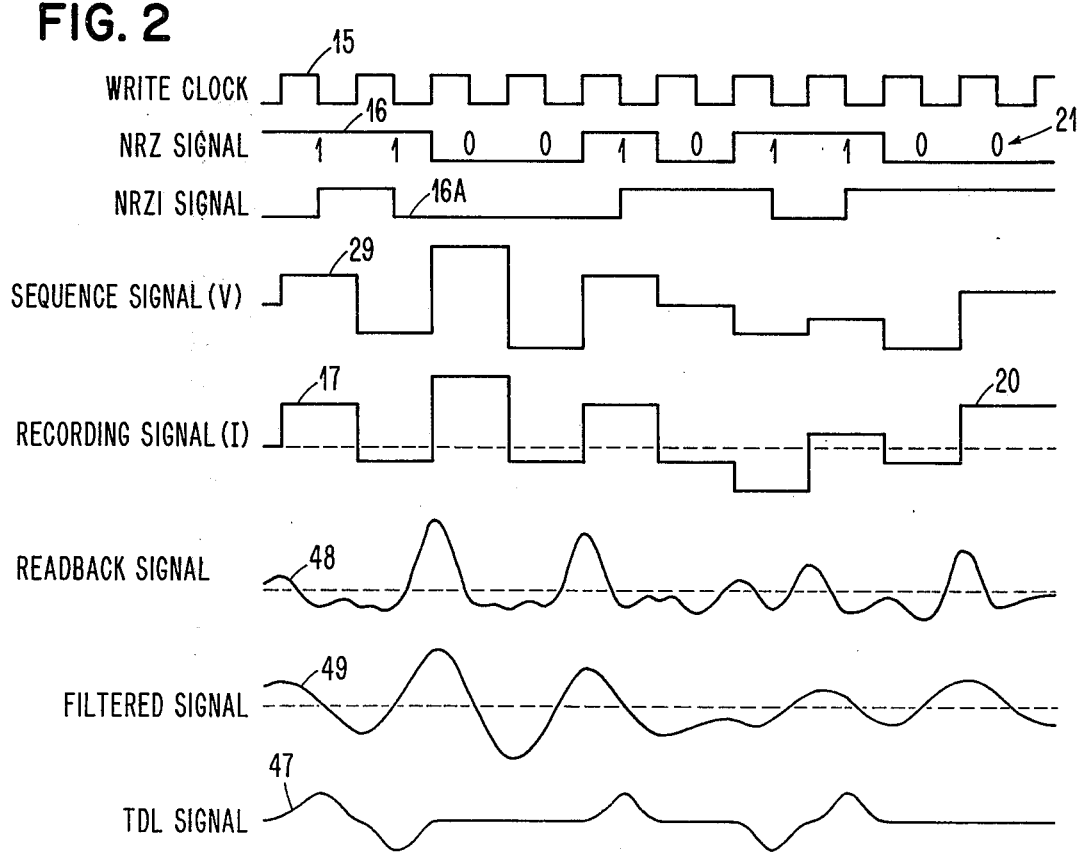
FIG. 2 is a set of idealized and simplified signal waveforms usable to explain the operation of the FIG. 1 illustrated recorder.

The readback portion of the FIG. 1 illustrated recording channel is very similar to other recorder readback circuits, except for the addition of the sequence generating filter 40 constructed similarly to the sequence generating filter 14 in the recording portion of the channel. For signal readback, transducer 36 supplies its readback signal 48 (FIG. 2) through amplifier and filter 41 (signal 49) thence, to sequence generating filter 40 and to a readback clock 42. Clock 42 is slaved to the readback signal supplied by amplifier and filter 41. In sequence generating filter 40, delay TDL-R1 corresponds and is constructed identically to recording delay line TDL-W1. Its output on cable 43 is over 20 lines which are then supplied to later-described summing circuit 44 to generate an intermediate sequence readback signal (not shown). Sequence generating filter TDL-R2 corresponds to write filter TDL-W2 with its output over 20 independent lines of cable 45 to final summer circuit 46 which supplies the TDL signal 47 (FIG. 2). TDL signal 47 travels to signal detector 50 for detection by any known signal detector including that shown by B. C. Fiorino in U.S. Pat. No. 3,818,501. Signal detector 50 is driven by clock 42 to synchronously detect the TDL signal 47 based upon the readback signal 49, as is well known in the arts. Clock 42, in addition to being slaved to the amplifier and filter 41 supplied signal 49, can be slaved to the signal 47 or to the intermediate sequence signal from summer 44 (not shown). To this end, the synchronizing input to clock 42 is received by single-pole, triple-throw switch 51 which can be either electrically or manually set. As shown, it is a manual switch preferably set to receive signal 49 from amplifier and filter 41. In a practical embodiment, a switch 51 would not be used; rather, the clock 42 input would be selected from a point in the readback circuits found to be most advantageous for the particular circuit being used.

Figure 3:
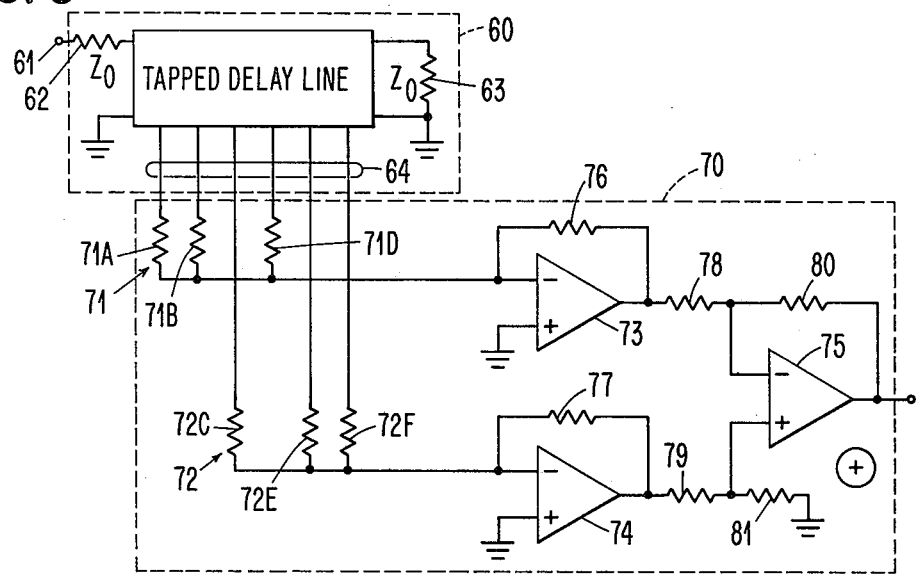
FIG. 3 is a diagram of a six-tap delay line usable to practice the invention in the apparatus illustrated in FIG. 1.

The general configuration of the delay lines constituting the sequence generating filters 14 and 40 is shown in schematic form in FIG. 3. The tapped delay line 60 corresponds to TDL-W1, TDL-W2, TDL-R1, and TDL-R2. The delay line receives a single signal at terminal 61 through characteristic impedance resistor 62. A tapped delay line receives the signal from resistor 62 and propagates same through the delay line to terminating characteristic impedance resistor 63. In a constructed embodiment, each tapped delay line has 20 taps. For purposes of brevity, only six are shown in FIG. 3. All the lines from the taps in the tapped delay line are represented by a cable 64 corresponding to cables 27, 31, 43, and 45.

The analog summing circuits are all constructed identically as shown by circuit 70, each consisting of two independent resistive summing networks 71 and 72 which, respectively, supply the resistively summed signals to differential amplifiers 73 and 74 and thence to summing differential amplifier 75. All of the summing resistors in the networks 71 and 72 have an impedance greater than the characteristic impedance of resistors 62 and 63 and have a value inversely proportional to the assigned sequence signal weight for the particular tap, i.e., are inversely proportional to the desired signal amplitude as set forth in Table 1. It is important that the summing amplifiers 73 and 74 have identical gain characteristics. Hence, their feedback resistors 76 and 77 have equal impedances. Also, the summing resistors 78 and 79 connected to the subsystem summing amplifier 75 have equal impedances. The resistors 80 and 81, connected as shown, for summing amplifier 75 also have equal impedances.

It should be noted that when the FIG. 3 illustrated delay line sequence generator is used in the recording circuits, the resistive values for the summing networks as at 71A, 71B, 72C, 71D, etc., follow the inverse of Table 1 values in that order, it being remembered that the actual impedance values are inversely proportional to the indicated Table 1 values. For readback, the assigned resistive values are reversed.; that is, the impedance of 72F corresponds to the recording resistive impedance of 71A, the impedance value of 72E corresponds with the recording resistive value of 71B, the resistive values of 71B and 72C on readback are swapped from that used for recording, while the values assigned to resistors 71B and 71A correspond, respectively, to the recording resistive values 72E and 72F.

Figure 4:
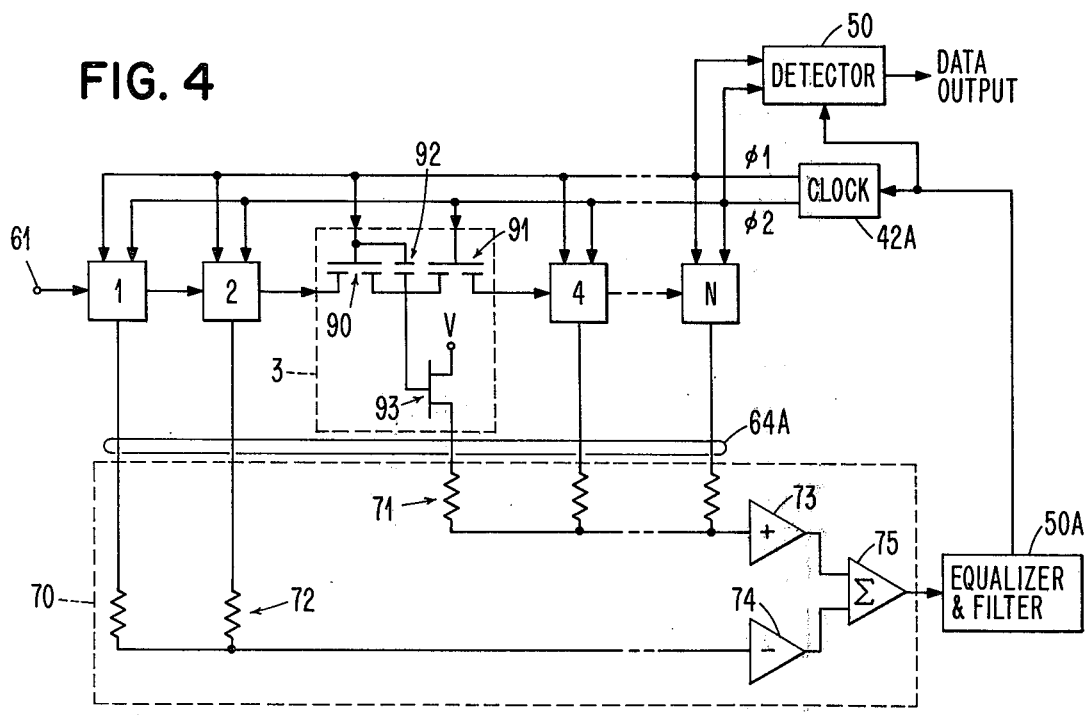
FIG. 4 is a synchronized tapped delay line constructed of charged transfer devices.

The FIG. 3 illustrated delay line and current summing embodiment uses well-known circuit components. It should be noted that the tapped delay line of circuit 60 has a fixed time period between successive taps, preferably equal to one nominal bit period (inner sequence) or 20 nominal bit periods (outer sequence). Such bit periods being nominal, errors may occur if the speed of transport of medium 10 past transducers 35 and 36 varies. Then, the frequency and hence the bit period duration also varies. Such variations cause signal distortion to occur in the TDL signal 47 (FIG. 2). Such perturbations show up as phase shift, baseline shift, and the like. In such a situation, detector 50 (FIG. 1) may include equalization circuits for accommodating such velocity variations. A better solution is the use of charge transfer devices which can be synchronized in operation by a readback clock 42 slaved to the readback signal. In this manner, speed variations of medium 10 transport are accommodated or tracked by the clock which, in turn, synchronously alters the sequence generation-to-follow-track speed variations of medium 10. This tracking eliminates most perturbations of the signal supplied to detector 50 caused by such speed variations. One form of charge transfer devices is described in the article "Charge-Coupled Devices", by Gilbert F. Amelio, *Scientific American*, Feb. 1974, Volume 230, Issue No. 2, on Pages 22-31, inclusive. Such devices can be utilized as a so-called "analog shift register". That is, an analog value or signal amplitude is captured and temporarily stored in a first one of several stages of a shift register using such devices. A clock actuates the shaft register to transfer the analog signal amplitude between successive stages with insubstantial losses. Hence, the output signal from the so-called "analog shift register" is a sequence of analog amplitudes closely replicating the input signal sequence, but with a predetermined time delay caused by the clock frequency and the number of shift stages in the analog shift register. Such a shift register is described in the referred-to *Scientific American* article. Also, such a device is shown in schematic form in FIG. 4, it being understood that the electrical signals correspond to the physical construction shown in the *Scientific American* article or other equivalents. FIG. 4 schematically illustrates a charge transfer device (CTD) delay line embodiment of the present invention. The embodiment compares favorably to that shown in FIG. 3 for more conventional or betterknown components. The signal from amplifier and filter 41 is received over terminal 61 and supplied to a first stage of the analog shift register consisting of CTD's. Each stage is identically constructed as shown in detailed schematic circuit diagram form for stage 3. Each stage is synchronously operated by phase 1 and phase 2 clock pulses of a two-phase clock 42A slaved to the output of equalizer and filter 50A which corresponds to slaving clock 42 to the TDL signal 47 (FIG. 2). Each stage has a pair of capacitive semiconductive storage elements 90 and 91, respectively, operated during phase 1 and phase 2. The phase 1 element has an output capacitive element 92 connected to its control region which, in turn, is connected to the base electrode of a field effect transistor (FET) output element 93. The drain of FET 93 is connected to a +V supply, while the source is connected to one electrical conductor of the output of the tapped delay line forming cable 64A corresponding to cable 64 of FIG. 3. Suitable resistors of resistive summing network 71 and network 72 are connected to sources of the various output FET's in the various stages. A pair of summing amplifiers 73 and 74 is shown in abbreviated form in FIG. 4, but constructed identically to that of FIG. 3. These amplifiers transfer the + and − summed signals to summing amplifier 75 which, in turn, outputs the TDL signal to equalizer and filter 50A. Details of operation of such an analog shift register can be determined from the *Scientific American* article, supra.

It is seen that clock 42A being slaved to the readback signal adjusts the elapsed time between successive stages by altering the frequency of the phase 1 and phase 2 signals. Hence, the delay line adapts to speed variations of medium 10 to always provide a precise autocorrelative function. The FIG. 4 illustrated circuit is preferred to be used on readback, i.e., as sequence generating filter 40. However, it is to be equally understood that write clock 12 can be slaved to a tachometer driven by record medium 10 such that the bit cells on medium 10 generated by write circuits 11 through the recording of signal 17 are maintained to be an equal distance by adjusting write clock frequency in accordance with speed variations.

FIG. 1 illustrates a single recording channel. It is to be understood that the present invention may be advantageously applied to a multitrack recording system such as indicated by lines 90 and 91 which diagrammatically represent other circuits for corresponding other channels identical to the illustrated channel having elements 11 through 51 in FIG. 1. For example, in present-day one-half inch recorders, nine such circuits as shown in FIG. 1 are used in a given recorder. Hence, lines 90 and 91 represent eight of such channels; while the remaining elements of FIG. 1 illustrate in detail the construction of a single one of those nine channels. Since the spacing of the tracks on conventional one-half inch 9-track tape is so substantial that crosstalk is not a problem, all of the sequence generating filters can be constructed identically. However, in disk recorders and possibly other recorders employing a higher track density, i.e., smaller spacing between adjacent tracks, crosstalk signals between tracks is possible. That is, the transducing gaps of transducers 35 and 36 are so closely spaced that there is interaction between adjacent ones of such gaps (not shown). In such an instance, alternate (all odd-numbered) tracks would have the same sequence as described for the FIG. 1 recorder; while interleaved tracks (even-numbered) would have time-reversed sequences. That is, the Table 1 indicated sequence values for the odd-numbered tracks have taps with resistive values beginning in the upper lefthand corner and across the top or first row, then across the second row, etc. For the even-numbered tracks, the sequence would begin in the lower righthand corner of the table, proceed right to left across the bottom row, then in the penultimate row from right to left, etc., upwardly to the top or first row. Using this arrangement, an orthogonality between the recording signals is produced for reducing such crosstalk (unwanted signals).

For improving linearity of the recording channel using a magnetic medium, it is desired that a synchronous bias be recorded in connection with the recording signal 17. Such synchronous bias recording is taught by Maxwell R. Cannon in U.S. Pat. 3,789,380. In applying Cannon's teaching to the present invention, the preferred bias frequency is twice the all-1's frequency, such that there is one cycle of bias per bit period. A filter (not shown) in the amplifier and filter 41 of the recorder rejects the bias component of the readback signal. Write clock 12 synchronously actuates bias circuit 100 (sine wave oscillator, for example) to supply a continuous bias signal to circuit 11 in a predetermined phase synchronism with the recording signal 17.

While the invention has been particularly shown and described with reference to a preferred embodiment thereof, it will be understood by those skilled in the art that various changes in form and details may be made therein without departing from the spirit and scope of the invention.

What is claimed is:

1. The method of linearly recording data signals on a magnetic record medium, the steps of:
    serially receiving a sequence of data bit signals, each signal occurring in a bit period;
    for each received data bit signal, generating a sequence of signal levels in accordance with a predetermined binary sequence extending over a predetermined number of data bit periods;
    summing the amplitudes of all said signal levels occurring in each said bit periods, respectively;
    recording said summed discrete levels on a record medium in a linear manner in accordance with said summed amplitudes;
    said binary sequence having MN discrete signal positions, M and N are integers;
    for each received data bit generating a first inner sequence of M signal levels, summing all said generated signal levels occurring in a given bit period and supplying an intermediate composite signal;
    generating a second and outer N-bit sequence of signal levels from said composite signal and summing all of said N-bit generated signal levels in each given bit period into a final signal level; and
    recording said final signal level on a record medium in a linear manner in accordance with said summed amplitudes.

2. The method set forth in claim 1 including the step of:
    generating said second and outer sequence such that each successively generated signal level is M bit periods later than the immediately previous signal level for interleaving said first sequence into said second sequence.

3. The method set forth in claim 1 wherein M equals N.

4. A digital signal recorder apparatus operable with a magnetic recording medium via a transducer;
    first electronic circuits coupled to said transducer for exchanging electrical signals therewith and having an electrical connection terminal for exchanging electrical signals with other electronic circuits;
    the improvement including in combination:
    tapped signal delay means having first and second terminals, one of said terminals being an input and another of said terminals being an output;
    said first terminal being connected to said electronic circuit terminals for exchanging discrete levels therewith;
    summing means having predetermined electrical connections to taps of said delay means for amplitude summing signals from said connections including a plurality of impedance elements respectively electrically connected to said taps and exhibiting impedances in accordance with a predetermined sequence of values for effecting an autocorrelative delta function to supply a composite signal; and
    said summing means being electrically interposed between said delay means and one of said terminals.

5. The apparatus set forth in claim 4 wherein said delay means is capable of different frequencies of operation; and
    further including timing means generating signals defining said bit periods and connected to said delay means for timing said delay means operation to be in synchronism with said bit periods.

6. The apparatus set forth in claim 4 wherein said tapped delay means consist of a plurality of cascode-connected delay lines with analog summing means interposed between said individual tapped delay lines for summing all signals from one of said tapped delay lines to supply a composite signal to another of said tapped delay lines such that the total permutations of signal sequences represented by said taps are increased as a product of the number of taps in successive ones of said delay lines.

7. The apparatus set forth in claim 4 wherein said signal exchanging with said magnetic medium is recording signals on said medium,
    the improvement further including in combination:
    a write clock supplying signals identifying said bit periods;
    a data source receiving said write clock signals for supplying data signals in accordance with said bit periods; and
    said tapped delay means including means capable of operating at different phase and frequency and receiving said write clock signals for synchronous delay operation with said data source.

8. The recorder apparatus set forth in claim 4 for transferring signals from a record medium to said other electronic circuits,
    the improvement further including in combination:
    said delay means including an analog shift register having a plurality of serially connected stages of charge transfer devices, two such serially connected devices per stage, a charge output connection means in each said stage connected to one of said charge transfer devices and being connected to a respective one of said taps;
    a timing signal generator in said other electronic circuits responsive to readback signals read from said record medium to adjust its operation to a predetermined frequency and phase relationship to said readback signals, and supplying alternating first and second timing signals having a relatively fixed phase relationship to said readback signals; and
    in each stage, a first of said devices responsive to said first timing signal to transfer an analog signal from a first device to a serially connected second one of said devices and a second one of said devices responsive to said second timing signal to transfer an analog signal from said second device to a said first device in a next one of said stages, respectively, all analog signal transfers proceeding from said first terminal toward said second terminal.

9. The signal recorder set forth in claim 4 further including bias supplying an AC signal in a predetermined phase synchronism with said bit periods; and said first electronic circuits receiving said AC signal and combining same with said discrete levels.

10. The signal recorder set forth in claim 4 wherein said impedance elements have impedances in accordance with a predetermined Huffman sequence.

11. The method of linearly recording data signals on a magnetic record medium further including the steps of:

serially receiving a sequence of data bit signals, each signal occurring in a bit period;

for each received data bit signal, generating a sequence of signal levels in accordance with a predetermined binary sequence extending over a predetermined number of data bit periods;

summing the amplitudes of all said signal levels occurring in each said bit periods, respectively;

recording said summed discrete levels on a record medium in a linear manner in accordance with said summed amplitudes;

recording said summed discrete levels in adjacent record tracks;

selecting a first binary sequence for a first track; and selecting a second binary sequence for an adjacent second track which second sequence has an orthogonal relationship to said first sequence.

* * * * *